UNITED STATES PATENT OFFICE.

RICHARD von FOREGGER, OF NEW YORK, N. Y., ASSIGNOR TO THE ROESSLER & HASSLACHER CHEMICAL COMPANY, OF NEW YORK, N. Y., A CORPORATION OF NEW YORK.

GREASELESS PEROXID PASTE.

1,018,240.  Specification of Letters Patent.  Patented Feb. 20, 1912.

No Drawing.  Application filed November 16, 1910.  Serial No. 592,653.

*To all whom it may concern:*

Be it known that I, RICHARD VON FOREGGER, a subject of the Emperor of Austria-Hungary, residing in the city of New York and State of New York, have invented a new and useful Greaseless Peroxid Paste, of which the following is a specification.

This invention relates to a greaseless peroxid paste particularly adapted for use for toilet purposes of various kinds and the object of the invention is to produce a greaseless paste of the character described, stable as such with a true peroxid incorporated therewith which will not be subject to decomposition before the use of the paste.

The incorporation of a true harmless peroxid such as a peroxid of the alkali or earth alkali metals, hydrogen peroxid, or zinc peroxid into a stable liquid or semiliquid paste, has up to the present time proved to be impracticable if not altogether impossible. The water hitherto necessarily contained in such preparation, either in its free state or in combination with the liquefier used, has reacted on the peroxid, decomposing the same, causing within a greater or less length of time the loss of available oxygen as well as other material changes. Pastes or creams have been produced by the use of mineral oils or greases as a basis, such latter being inert to the peroxid, but such greasy pastes or creams are not always desirable and their applicability is sometimes entirely unsuitable, as for instance in the case of a tooth paste; neither are organic fats available for this purpose, on account of their great affinity for oxygen, in which combination they are apt to form fatty acids, which are irritative or detrimental to the tissues of the body, while at the same time they are subject to drying.

I have discovered that it is possible to make a greaseless stable peroxid paste in which the available oxygen will not be lost before the use of the paste and without having any of the objections heretofore found to various peroxid pastes of the character hereinabove described.

I have found that the combination of one of the trihydric alcohols, such as glycerin, used as a liquefying basis with a suitable peroxid, either with or without other substances used in combination therewith, such as fillers, perfumes, detergents, soaps or otherwise, results in a greaseless stable composition of matter or paste, in which the available oxygen is not reacted upon by any of the ingredients of the paste, the available oxygen being held ready for use, in the absence of water, almost indefinitely. The water contained, for example, in the U. S. P. standard preparation of glycerin, or even a small percentage beyond this prescribed amount, is not detrimental to the peroxid used as it has a stronger affinity to glycerin and to inorganic salts, such as for instance chalk, which may form an ingredient of the paste, than it has to the peroxid.

Such a greaseless peroxid paste as I have described in which, for example, glycerin is used as a basis, will not decompose when it is stored in individual containers, nor will it shrink or change in volume, as all pastes or creams do which contain water as a liquefier, and its available oxygen will keep until liberated in actual use by contact with the secretive elements of living animal tissue.

The merits of such greaseless peroxid paste as I have described are found in its disinfecting, stimulating, cleansing and bleaching properties. It is distinguished from other antiseptic creams or pastes by the entire absence of irritative effects, especially on mucous membranes, and hence is superior to such other antiseptic creams or pastes; in fact, if the new paste described is used as a tooth paste it stimulates the secretions of the salivary glands without causing any irritation.

I have found that a satisfactory paste can be made by the use of from 4% to 10% of a suitable peroxid in combination with glycerin and other substances, although the glycerin or other trihydric alcohol being used as a liquefier, should the paste comprise peroxid and glycerin only, or in combination with but very small proportions of other substances, there should be sufficient glycerin used to bring the peroxid or the mixture to the proper consistency, and I do not desire to restrict myself to any proportions of ingredients used.

Under the term "peroxid" I include peroxids of the alkali or earth alkali metals, such as calcium, magnesium and strontium peroxid and sodium and magnesium perborate, zinc peroxid or zinc perborate, although I do not restrict myself further than the scope of the claims demand to the use of any particular peroxid. Of course, the peroxid or peroxid salt used should preferably be harmless to living tissue.

By the term "trihydric alcohol" I mean to include any suitable alcohol of the trihydric group of which I have found glycerin to be the most satisfactory, although I do not restrict myself further than the scope of the claims demand to the use of any particular trihydric alcohol.

It is within the scope of my invention to use a combination of a trihydric alcohol, such as glycerin, for example, and a peroxid, such as magnesium or calcium peroxid or a combination of suitable peroxids in connection with other ingredients to form various kinds of pastes having various properties other than that of giving off oxygen.

I shall illustrate my invention by giving one example of such adaptation of my invention, although it is to be understood that the example is illustrative of only one way of putting into practice the advantages of the invention.

In order to make a tooth paste, for example, I recommend the following formula: Talcum 2 lbs.; precipitated chalk 4 lbs.; carbonate of magnesium 4 lbs.; castile soap 10 lbs.; cuttle fish bone 1 lb.; orris root 3 lbs.; magnesium peroxid 3 lbs.; calcium peroxid 1 lb.; glycerin 45 lbs., together with a small amount of essential oil to serve as a flavoring.

The ingredients given above may be combined as follows: The talcum, precipitated chalk, carbonate of magnesium and soap are mixed together by themselves and the essential oil is added to and mixed with the orris root and cuttle fish bone. The two mixtures are then mixed together and the peroxid added to the same. Glycerin is added until the paste has the desired consistency.

In the claims where I use the term "alkali peroxid" I mean to include as well an earth alkali peroxid.

It is obvious that many combinations of materials may be made within the scope of my invention and as above pointed out I do not restrict myself to the use of any combination of ingredients further than the scope of the claims demand.

What I claim and desire to secure as Letters Patent is:

1. A greaseless peroxid paste which is stable and contains a trihydric alcohol and a solid peroxid.

2. A greaseless peroxid paste which is stable and contains glycerin and a solid peroxid.

3. A greaseless peroxid paste which is stable and contains a trihydric alcohol and a solid peroxid insoluble in water.

4. A greaseless peroxid paste which is stable and contains glycerin and a solid peroxid insoluble in water.

5. A greaseless peroxid paste which is stable and contains a trihydric alcohol and an alkali peroxid.

6. A greaseless peroxid paste which is stable and contains glycerin and an alkali peroxid.

In testimony whereof I have signed this specification in the presence of two subscribing witnesses.

RICHARD von FOREGGER.

Witnesses:
SEABURY C. MASTICK,
K. G. LEARD.